United States Patent
Ferlicca

(10) Patent No.: US 6,367,601 B1
(45) Date of Patent: Apr. 9, 2002

(54) FRICTION DAMPER FOR WASHING MACHINES

(76) Inventor: Roberto Ferlicca, Via Peave, 66, 20040 Busnago, Milan (IT)

( * ) Notice: Subject to any disclaimer, the term of this patent is extended or adjusted under 35 U.S.C. 154(b) by 0 days.

(21) Appl. No.: 09/341,235

(22) PCT Filed: Dec. 18, 1997

(86) PCT No.: PCT/IT97/00314

§ 371 Date: Aug. 18, 1999

§ 102(e) Date: Aug. 18, 1999

(87) PCT Pub. No.: WO98/30812

PCT Pub. Date: Jul. 16, 1998

(30) Foreign Application Priority Data

Aug. 1, 1997 (IT) .......................................... MI97A0019

(51) Int. Cl.$^7$ .............................................. F16F 11/00
(52) U.S. Cl. ...................................................... 188/381
(58) Field of Search .......................... 188/381, 322.16, 188/322.17, 129

(56) References Cited

U.S. PATENT DOCUMENTS

| | | | | |
|---|---|---|---|---|
| 4,934,493 A | * | 6/1990 | Bauer et al. ................. | 188/381 |
| 5,080,204 A | * | 1/1992 | Bauer et al. ................. | 188/129 |
| 5,174,551 A | * | 12/1992 | Mintgen ....................... | 267/120 |
| 5,295,564 A | * | 3/1994 | Stadelmann ................ | 188/381 |
| 5,535,861 A | * | 7/1996 | Young ......................... | 188/281 |
| 5,549,182 A | * | 8/1996 | Ehrnsberger et al. ....... | 188/129 |
| 5,934,419 A | * | 8/1999 | Riad ........................... | 188/129 |
| 5,946,946 A | * | 9/1999 | Sharp et al. ................ | 68/23.1 |

FOREIGN PATENT DOCUMENTS

| | | | |
|---|---|---|---|
| EP | 0544633 A1 | * | 2/1993 |
| FR | 1336185 | * | 7/1963 |

* cited by examiner

Primary Examiner—Robert J. Oberleitner
Assistant Examiner—Benjamin A. Pezzlo
(74) Attorney, Agent, or Firm—Hedman & Costigan, P.C.

(57) ABSTRACT

The present invention relates to a friction damper, which has been specifically designed for washing machines or the like, comprising a hollow shell (1) and a rod (2), coaxially arranged with respect to one another, which define a telescopic construction. The rod is provided with an outer diameter smaller than the inner diameter of the shell (1) and, between the shell (1) and rod (2), a friction damper element (3) is arranged. The friction damper element (3) comprises at least two friction clamps (4,5) contacting the surface of the rod (2) and axially spaced from one another, along that portion of the rod (2) which is engaged in the shell.

3 Claims, 3 Drawing Sheets

FRICTION DAMPER FOR WASHING MACHINES

BACKGROUND OF THE INVENTION

The present invention relates to a friction damper, which has been specifically designed for washing machines or the like.

As is known, the basket of a washing machine is conventionally suspended, at the top thereof, to the bearing framework of the washing machine by a pair of springs and is coupled, at the bottom thereof, to said washing machine bearing framework, by a pair of dampers.

Said dampers are designed to damp the oscillations affecting the washing machine basket during the operation of said washing machine, because of the turning movement of the basket and the uneven distribution of the linen being washed in the basket, i.e. about the axis of said basket.

The oscillations or vibrations of the washing machine basket have a greater amplitude at the start and end of the centrifuging operation of the washing machine, i.e. as the basket rotary speed variation is the greatest.

Conventional dampers used in conventional washing machine generally comprise a hollow shell and a rod which are coaxially arranged with respect to one another so as to form a telescopic construction.

The damping effect is usually derived from a pressing of the air held inside the assembly including said rod and shell, which air is pressed because of an overall reduction of the length of the shell rod.

Among the commercially available washing machine dampers, friction dampers are also known, i.e. dampers which, together with the damping effect provided by the mentioned pressing of the air held therein, further comprise a friction clamp, arranged between the inner surface of the shell and the outer surface of the rod.

Usually, such a friction clamp is affixed to the inner surface of the shell, the operating friction being generated between the clamp and outer surface of the rod.

Prior friction dampers, however, are affected by a quick wear of their rod, as well as a comparatively high operating noise.

The document FR-A-1322585 discloses a friction damper comprising friction clamps arranged between the inner surface of the damper shell and the outer surface of the damper rod.

SUMMARY OF THE INVENTION

The aim of the present invention is to overcome the above mentioned problem, by providing a friction damper, which has a comparatively small wear, and, accordingly, a much greater operating life with respect to conventional friction damper.

Within the scope of the above mentioned aim, a main object of the present invention is to provide such a friction damper, the components of which are affected by small mechanical stresses so as to prevent said damper from unnecessarily failing.

Yet another object of the present invention is to provide such a damper the operating noise of which is very reduced.

Yet another object of the present invention is to provide such a friction damper which is very reliable and safe in operation.

Yet another object of the present invention is to provide such a friction damper which can be made at a competitive cost.

According to one aspect of the present invention, the above mentioned aim and objects, as well as yet other objects, which will become apparent hereinafter, are achieved by a friction damper, according to claim 1.

BRIEF DESCRIPTION OF THE DRAWINGS

Further characteristics and advantages of the friction damper according to the present invention will become more apparent hereinafter from the following detailed disclosure of some preferred, though not exclusive, embodiments of said damper, which are shown, by way of a merely indicative, but not limitative, example, in the accompanying drawings, where.

DESCRIPTION OF THE PREFERRED EMBODIMENTS

Figure 1:
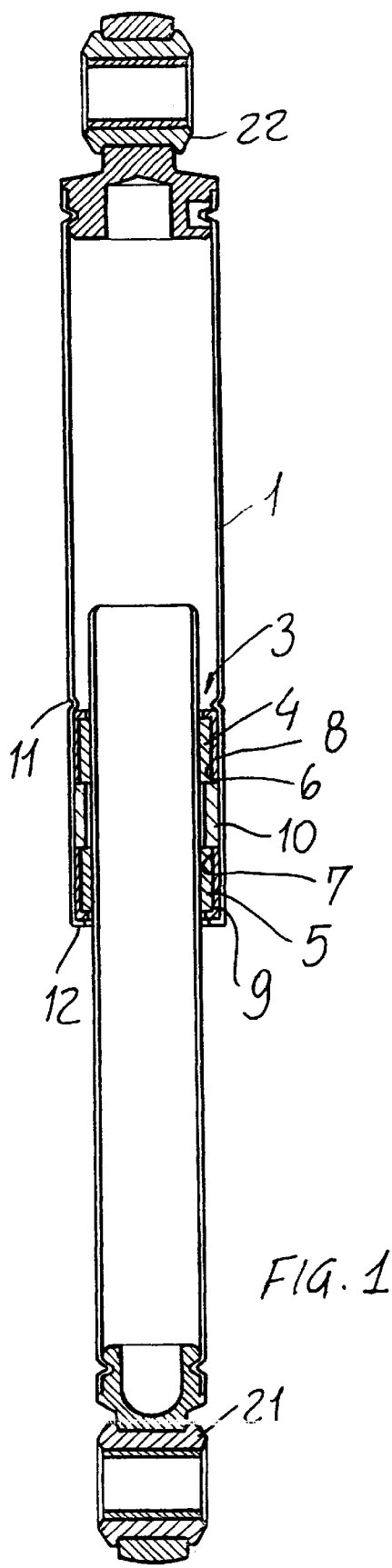
FIG. 1 is an axial cross-sectional view illustrating a first embodiment of the damper according to the present invention.
Figure 2:
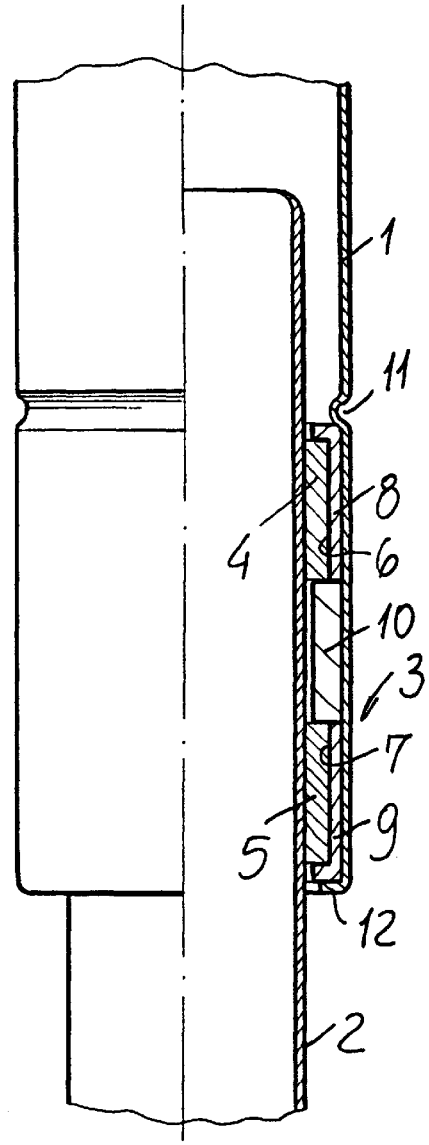
FIG. 2 illustrates an enlarged detail of FIG. 1.

With reference to the number references of the above mentioned figures, the damper according to the present invention comprises a hollow shell 1 and a rod 2, which rod is coaxially engaged, by a portion thereof, through one axial end of the shell 1.

The rod 2 is provided with an outer diameter which is smaller than the inner diameter of the shell 1, and between the outer surface of the rod 2 and inner surface of the shell 1, a friction damper element is arranged, which has been overally indicated by the reference number 3.

The friction damper element 3 comprises at least two friction clamps 4 and 5, which are slidably engaged with the outer surface of the rod 2 and are axially spaced from one another along that portion of the rod 2 which is engaged inside the shell 1.

The friction clamps 4 and 5 are housed in suitable recesses 6 and 7, defined on the inner surface of one or two holding bushes 8 and 9.

More specifically, a single holding bush or bushing can be also provided, on the inner surface of which would be formed the two mentioned recesses 6 and 7, by providing, for that region of the holding bushing extending between the two recesses 6 and 7, a diameter much greater than the outer diameter of the rod 3, so as to define in this region a holding space for holding therein the friction material generated because of the wear of the friction clamps 4 and 5. Alternatively, as shown in the accompanying figures, it would also be possible to provide two holding bushings 8 and 9, on the inner surface of each of which would be defined a recess 6 and 7 for housing the mentioned friction clamps 4 and 5, between the two holding bushings 8 and 9 a spacer bushing or bush being moreover arranged, as indicated by the reference number 10.

Likewise, the spacer bushing 10 will have a diameter much greater than the outer diameter of the rod 2.

Thus, in this region a space would be defined for collecting therein the frictionally removed material, which is removed because of the wear of the friction clamps 4 and 5.

The frictionally removed material due to the wear of the friction clamps 4 and 5 will be collected in this region, thereby allowing the rod 2 to properly slide along the friction clamps 4 and 5, while reducing the wear of said rod 2.

The holding bushing or bushings 8 and 9 are axially locked inside the shell 1 between two axial shoulders 11 and 12 projecting from the inner surface of the shell 1 and preferably comprising two ring-like plastically deformed portions.

Figure 4:
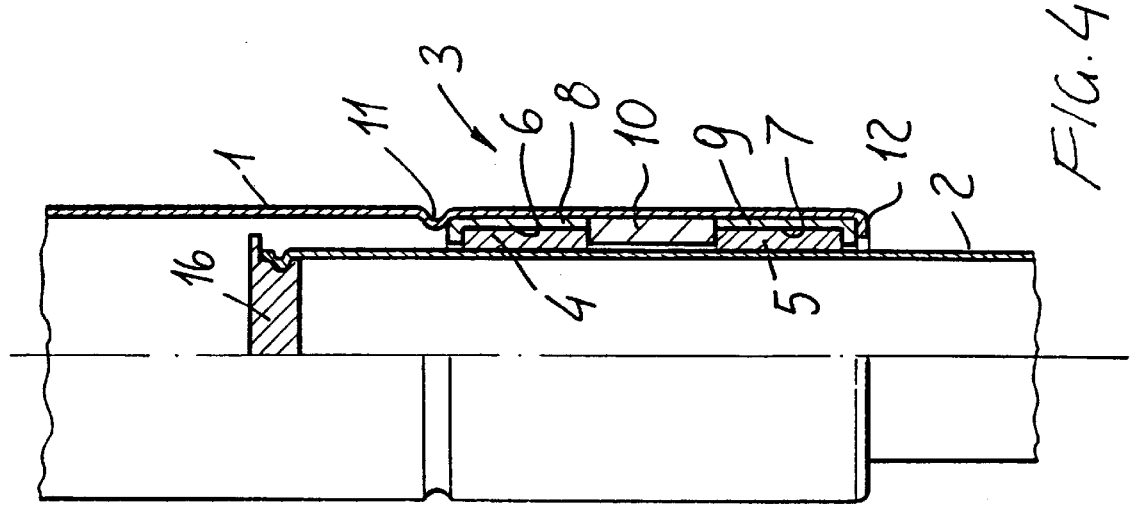
FIGS. 3 and 4 are axial cross-sectional views illustrating two further embodiments of the damper according to the invention.
Figure 3:
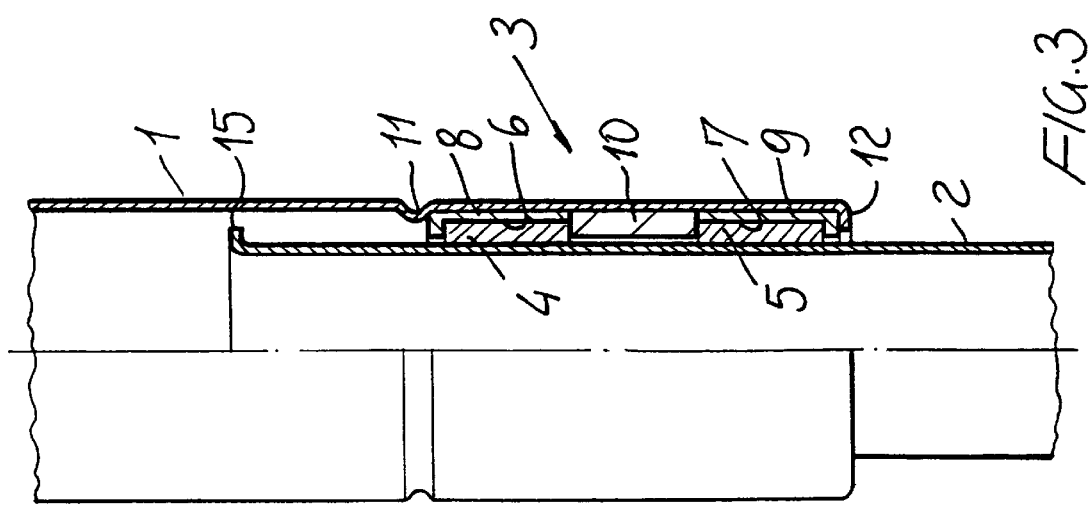

As shown in FIGS. 3 and 4, the end to the rod 2 engaged in the shell 1 is provided with an anti-disengaging shoulder, which can be abutted against the shoulder 11 of the shell 1, or the shoulder locking the friction clamp housing bush or bushings, and which is arranged further inside the shell 1.

Said anti-disengaging shoulder can comprise, as clearly shown in FIG. 3, an edge portion 15 outwardly projecting from that end of the rod 2 which is engaged in the shell 1, and which can be simply made by a plastic deforming operation.

As is shown in FIG. 4, said shoulder can also comprise a head element 16, engaged in that end of the rod 2 which is arranged inside the the shell 1.

The anti-disengaging head element 16 can be locked by plastically deforming the end portion of the rod 2.

Figure 5:
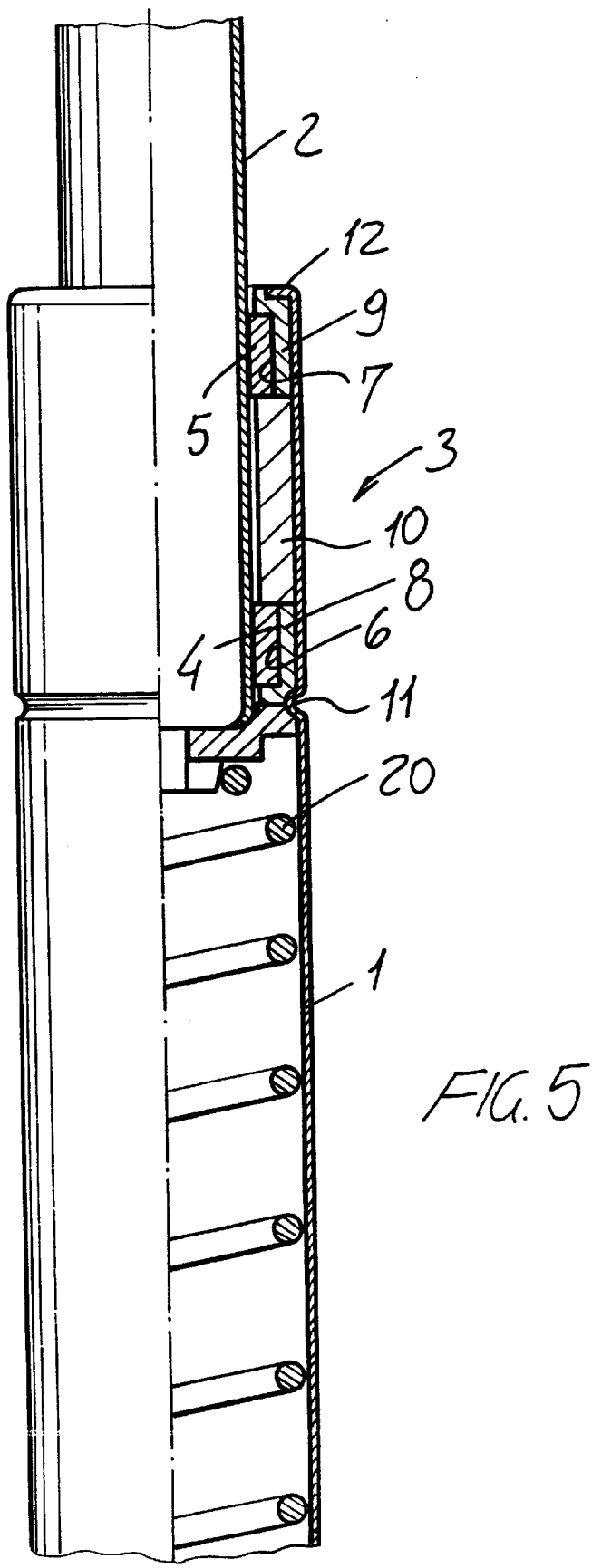
FIG. 5 is an axial cross-sectional view illustrating a further embodiment of the damper according to the present invention.

As shown in FIG. 5, between the end of the rod 2 engaged inside the shell 1 and the end of the shell 1 facing said end of the rod 2, a suspending resilient means can be arranged, said resilient means merely comprising a coil spring 20.

Said coil spring will operate in order to prevent a reduction of the length of the telescopic assembly constituted by the shell 1 and rod 2, by replacing or favoring the operation of the suspending springs usually coupling the top portion of the basket to the bearing framework of the washing machine.

The operation of the friction damper according to the present invention will be self evident from the preceding disclosure.

In particular, it should be apparent that the oscillations or vibrations of the basket will be efficiently damped because of the friction sliding of the rod 2 along the friction clamps 4 and 5.

Actually, the friction clamps 4 and 5 will also advantageously provide a very accurate guide function, for guiding the rod 2 inside the shell 1, while providing a noiseless operation of the subject damper.

Moreover, the provision of at least two friction clamps will provide an enlarged friction surface, thereby enhancing the damping effect while reducing the specific radial load on the friction clamps, thereby providing a longer life for the damper.

On the end of the rod 2 engaged inside the shell 1 and on the end of the shell 1 opposite to the end thereof therethrough said rod 2 passes, anchoring heads 21 and 22 are mounted, said head being of a known type and, accordingly, they will not be further disclosed herein.

From the above disclosure and from the figures of of the accompanying drawings, it should be apparent that the invention fully achieves the intended aim and objects.

In particular, the fact is to be pointed out that a friction damper has been provided which will have a great duration, while providing a very efficient damping and a practically noiseless operation.

While the invention has been disclosed and illustrated with reference to preferred embodiments thereof, it should be apparent that the disclosed embodiments are susceptible to several variations and modifications all of which will come within the scope of the appended claims.

What is claimed is:

1. A friction damper for washing machines comprising a hollow shell and a rod, coaxially arranged with respect to one another and forming a telescopic construction, said rod having an outer diameter less than an inner diameter of said shell, between said shell and rod a friction damper element being arranged, said friction damper element comprising at least two friction clamps, contacting an outer surface of said rod and being axially spaced from one another along a portion of said rod engaged in said shell, wherein said friction clamps are housed in recesses formed on an inner surface of a holding bushing, said holding bushing being axially locked in said shell by two shoulders projecting from and inner surface of said shell, and wherein said holding bushing, through a region thereof included between said recesses, is spaced from said outer surface of said rod to define a space to collect therein the frictionally removed material deriving from a wear of said friction clamps.

2. A damper according to claim 1, wherein said friction clamps are housed each in a recess, defined on an inner surface of a respective holding bushing, axially locked in said shell, and wherein between said holding bushings a spacer bushing is arranged.

3. A damper according to claim 2, wherein said spacing bushing is provided with an inner diameter larger than the outer diameter of said rod in order to define, between said two friction clamps, a collecting space to collect therein a frictionally removed material deriving from wear of said friction clamps.

* * * * *